US008076792B2

(12) United States Patent
Shima et al.

(10) Patent No.: US 8,076,792 B2
(45) Date of Patent: Dec. 13, 2011

(54) POWER LINE COMMUNICATION APPARATUS

(75) Inventors: Kenji Shima, Tokyo (JP); Minoru Ozaki, Tokyo (JP); Mitsuo Shimotani, Tokyo (JP); Takeshi Mitsui, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 367 days.

(21) Appl. No.: 12/373,496

(22) PCT Filed: Jun. 7, 2007

(86) PCT No.: PCT/JP2007/061557
§ 371 (c)(1),
(2), (4) Date: Jan. 12, 2009

(87) PCT Pub. No.: WO2008/041393
PCT Pub. Date: Apr. 10, 2008

(65) Prior Publication Data
US 2009/0267409 A1    Oct. 29, 2009

(30) Foreign Application Priority Data

Sep. 29, 2006 (JP) ................................ 2006-268279

(51) Int. Cl.
*H02J 1/00* (2006.01)
(52) U.S. Cl. ..................................... 307/1; 307/3; 307/4
(58) Field of Classification Search .................. 307/1, 3, 307/4
See application file for complete search history.

(56) References Cited

U.S. PATENT DOCUMENTS

| 3,931,566 A | * | 1/1976 | Pask et al. ...................... 323/285 |
| 5,523,811 A | | 6/1996 | Wada et al. |
| 2002/0137462 A1 | | 9/2002 | Rankin |

FOREIGN PATENT DOCUMENTS

| JP | 2-281821 A | 11/1990 |
|----|---|---|
| JP | 4-342632 A | 11/1992 |
| JP | 5-294183 A | 11/1993 |
| JP | 2003-118509 A | 4/2003 |
| JP | 2003-163618 A | 6/2003 |
| JP | 2004-056197 A | 2/2004 |
| JP | 2004056197 A * | 2/2004 |
| JP | 2004-096331 A | 3/2004 |
| JP | 2004-529545 A | 9/2004 |
| JP | 2004-336483 A | 11/2004 |
| JP | 2004-343796 A | 12/2004 |
| JP | 2005-051768 A | 2/2005 |
| JP | 2005-269513 A | 9/2005 |
| JP | 2005-277666 A | 10/2005 |
| WO | WO-02/076040 A1 | 9/2002 |

OTHER PUBLICATIONS

Machine Translation of JP-2004-056197 (Hattori et al.), obtained Feb. 27, 2011.*

* cited by examiner

*Primary Examiner* — Rexford Barnie
*Assistant Examiner* — Hal Kaplan
(74) *Attorney, Agent, or Firm* — Birch, Stewart, Kolasch & Birch, LLP

(57) ABSTRACT

A power line communication apparatus includes power lines disposed independently and individually, for connecting various loads to a battery by way of fuses, respectively, an inductor disposed at an end portion of each of the above-mentioned power lines on a side connected to the above-mentioned battery, and an information unit for transmitting information by way of each of the above-mentioned power lines.

8 Claims, 9 Drawing Sheets

(a)

(b)

(c)

POWER LINE COMMUNICATION APPARATUS

FIELD OF THE INVENTION

The present invention relates to a power line communication apparatus for use in, for example, a vehicle, which uses power lines connected to various loads, which are connected to a battery, individually and independently for transmission of information, respectively.

BACKGROUND OF THE INVENTION

A vehicle is provided with a battery as a power supply, and an engine ECU, a starter motor, an alternator generator, etc. are connected to the positive electrode of the battery by way of fuses, respectively. In this case, the engine ECU, the starter motor, the alternator generator, etc. are divided into several groups according to their uses, and are connected to the battery by way of their respective power lines for exclusive use. Therefore, in a case in which communications are carried out using power lines, it is possible to construct a communication path by using a plurality of power lines, rather than to construct a communication path by using only a single power line.

In this case, as shown in patent reference 1, if communications are carried out in a common mode in which each load is connected between a power line and a chassis ground, the radiation power from the power line becomes large, though the wiring can be formed easily at a low cost.

Furthermore, as shown in patent reference 2, in a differential mode in which each load is connected between two power lines, the radiation power caused by power line communications can be further reduced compared with communications in the common mode.

[Patent reference 1] JP,2004-343796,A
[Patent reference 2] JP,2005-269513,A

Conventional power line communications include communications in the common mode and communications in the differential mode. Even when communications in either of the two different modes are carried out, if a plurality of power lines connected to a single battery are used for the communications, conduction noise is transmitted between the power lines and the communication quality is degraded.

The present invention is made in order to solve the above-mentioned problem, and it is therefore an object of the present invention to provide a power line communication apparatus which can prevent conduction noise from propagating between power lines, and which can carry out proper communications at a high speed.

DISCLOSURE OF THE INVENTION

A power line communication apparatus in accordance with the present invention includes power lines disposed independently and individually, for connecting various loads to a battery by way of fuses, respectively, an inductor means disposed at an end portion of each of the above-mentioned power lines on a side connected to the above-mentioned battery, and an information means for transmitting information by way of each of the above-mentioned power lines.

In the power line communication apparatus in accordance with the present invention, the inductance means is disposed in a vicinity of the fuse disposed for each of the power lines which is connected to the battery via the fuse and is disposed independently and individually. Therefore, conduction noise which propagates to each of the power lines can be prevented by the inductance means, and does not propagate to any other power lines. As a result, because each power line is not influenced by conduction noise which occurs in any other power line, the power line communication apparatus can carry out proper communications. Furthermore, by dividing the loads into groups according to their uses and using a plurality of power lines respectively connected to the groups, the reliability of the communication system can be improved and the communications can be speeded up.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
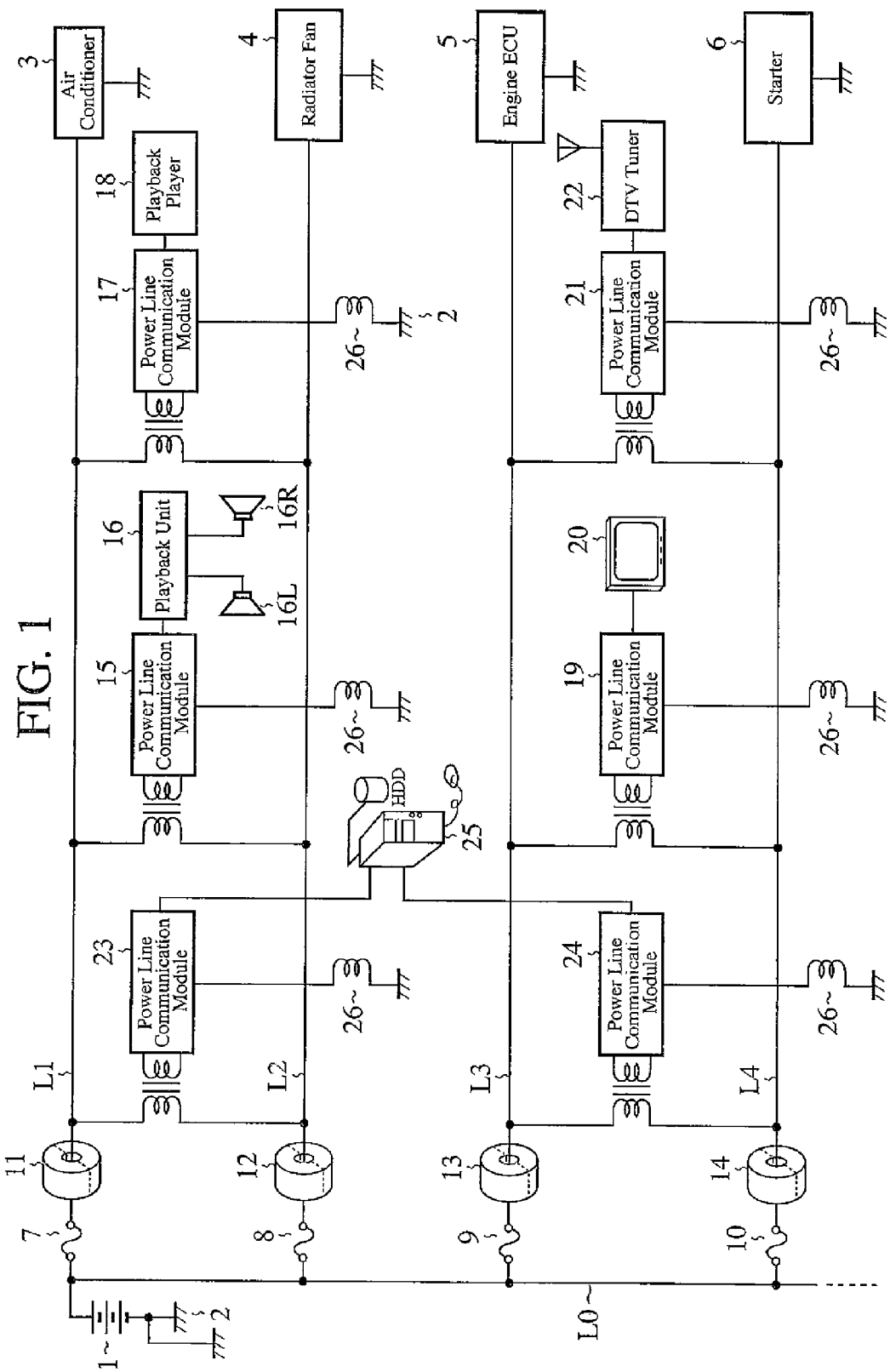
FIG. 1 is a circuit connection diagram in a case in which power line communications are carried out by using a pair of power lines.

FIG. 1 is a circuit connection diagram showing a power line communication apparatus in accordance with Embodiment 1 of the present invention. In the figure, a battery 1 disposed as a power supply has a negative electrode which is connected to a ground 2, such as an engine ground or a chassis ground, and a positive electrode which is connected to loads, such as an air conditioner 3, a radiator fan 4, an engine ECU 5 and a starter 6, by way of power lines L1, L2, L3, and L4, respectively. Fuses 7, 8, 9, and 10, and inductance means 11, 12, 13, and 14 are connected to end portions on a side of the battery 1 of the power lines L1, L2, L3, and L4, respectively.

FIG. 1 shows an example in which power line communications are carried out with those power lines L1, L2, L3, and L4 being divided into two pairs of two power lines (L1 and L2, and L3 and L4), and in which playback equipment 16 is connected between the power lines L1 and L2 by way of a power line communication module 15, and a playback player 18 is connected between the power lines L1 and L2 by way of a power line communication module 17. On the other hand, a liquid crystal display monitor 20 is connected between the power lines L3 and L4 by way of a power line communication module 19, and a digital television tuner (referred to as a DTV tuner from here on) 22 is connected between the power lines L3 and L4 by way of a power line communication module 21.

Furthermore, a power line communication module 23 connected between the power lines L1 and L2 and a power line communication module 24 connected between the power lines L3 and L4 are connected to each other by way of a gateway 25. A choke coil 26 for reducing radiated noise is also connected between each of the power line communication modules 15, 17, 19, 21, 23, and 24 and the ground 2.

Next, the operation of the power line communication apparatus will be explained. Power is supplied from the battery 1 to the loads, such as the air conditioner 3, the radiator fan 4, the engine ECU 5, and the starter 6, by way of the power lines L1, L2, L3, and L4.

On the other hand, when a playback signal generated by the playback player 18 disposed in, for example, a front panel is sent out to the power lines L1 and L2 by way of the power line communication module 17, the playback signal propagates through the power lines L1 and L2, enters the playback equipment 16 by way of the power line communication module 15, and is then played back by the playback equipment and is outputted from speakers 16L and 16R. Furthermore, digital TV information received by the DTV tuner 22 is sent out to the power lines L3 and L4 by way of the power line communication module 21, propagates through those power lines L3 and L4, and is then displayed on the liquid crystal display monitor 20 by way of the power line communication module 19.

Figure 2:
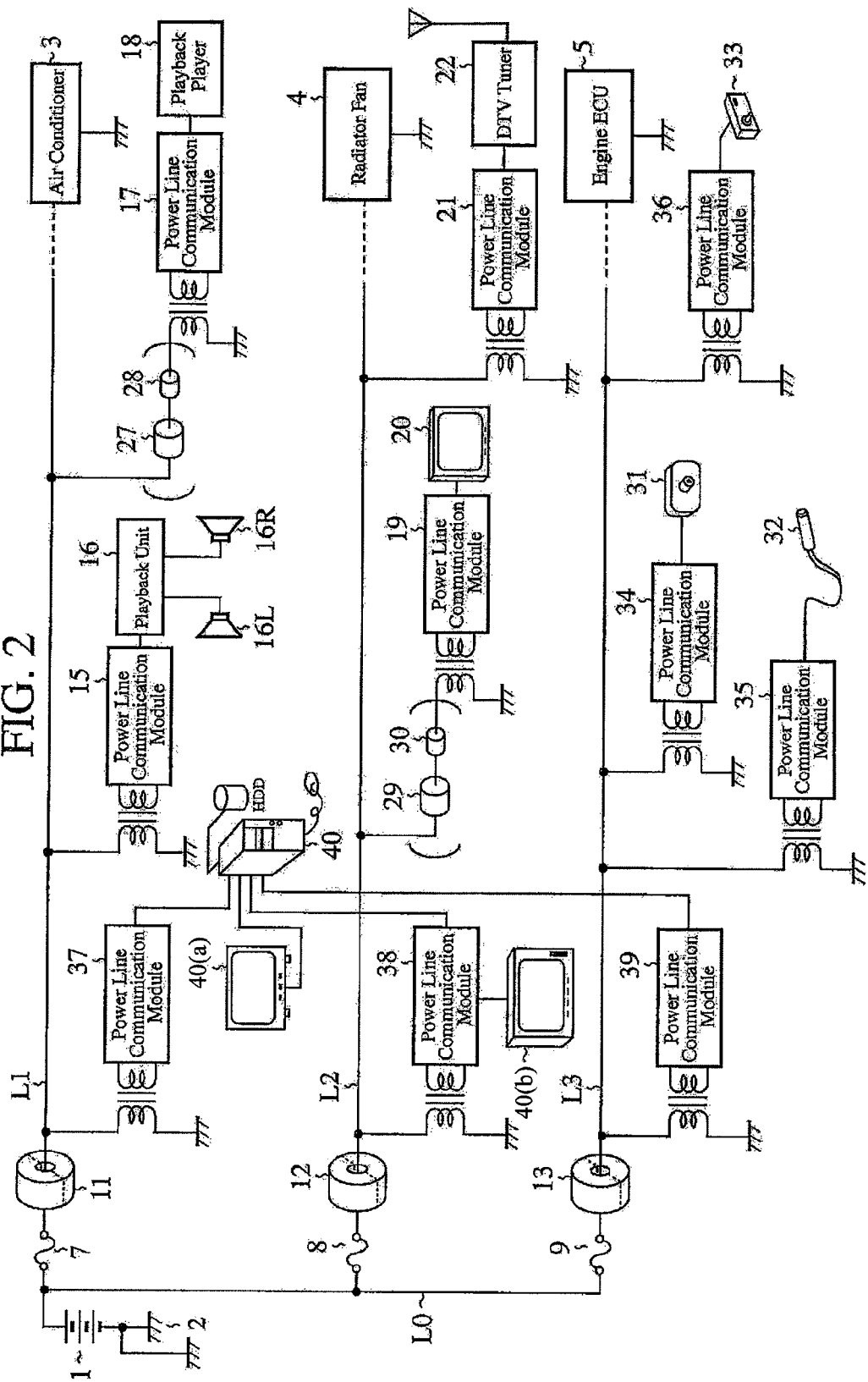
FIG. 2 is a circuit connection diagram in a case in which power line communications are carried out by using a single power line.

FIG. 2 shows an example (common mode) in which power line communications are carried out with each of power lines L1, L2, and L3 being used independently, and in which playback equipment 16 installed on a front seat side is connected to the power line L1 (an accessory line) by way of a power line communication module 15, and a playback player 18 is connected to the power line L1 by way of a cigar socket 27, a cigar plug 28, and a power line communication module 17. On the other hand, a liquid crystal display monitor 20 is connected to the power line L2 (a battery line) by way of a cigar socket 29, a cigar plug 30, and a power line communication module 19, and a digital television tuner (referred to as a DTV tuner from here on) 22 installed on a back seat side is connected to the power line L2 by way of a power line communication module 21. Furthermore, monitoring cameras 31, 32, and 33 are connected to the power line L3 (an illumination line) by way of power line communication modules 34, 35, and 36, respectively. In addition, while power line communication modules 37, 38, and 39 respectively connected to the power lines L1, L2, and L3 are connected to a common gateway 40, a liquid crystal display monitor 40a is connected to this gateway 40 and a navigation apparatus 40b is connected to the power line communication module 38.

Next, the operation of the power line communication apparatus will be explained. For example, when a playback signal produced by the playback player 18 is sent out to the power line L1 by way of the power line communication module 17, the cigar socket 27, and the cigar plug 2S, the playback signal propagates through the power line L1, enters the playback equipment 16 by way of the power line communication module 15, and is then played back by the playback equipment and is outputted from speakers 16L and 16R. Furthermore, digital TV information received by the DTV tuner 22 is sent out to the power line L2 by way of the power line communication module 21, propagates through the power line L2, and is then displayed on the liquid crystal display monitor 20 by way of the cigar socket 29, the cigar plug 30, and the power line communication module 19.

On the other hand, the playback signal produced by the playback player 18 placed in the front seat is also transmitted to the liquid crystal display monitor 20 placed in the back seat by way of the power line L1, the power line communication module 37, the gateway 40, the power line communication module 38, the cigar socket 29, the cigar plug 30, and the power line communication module 19. In addition, pieces of imaging information from the monitoring cameras 31, 32, and 33 are transmitted to the liquid crystal display monitor 20 by way of the power line communication modules 34, 35, and 36, the power line L3, the power line communication module 39, the gateway 40, the power line communication module 38, the power line L2, the cigar socket 29, the cigar plug 30, and the power line communication module 19.

As mentioned above, in accordance with Embodiment 1, the inductance means 11 to 14, as well as the fuses 7 to 10, are disposed for the power lines L1, L2, L3, and L4 on the side of connecting with the battery 1 disposed as the power supply. Therefore, conduction noise which occurs in each of the power lines L1, L2, L3, and L4 can be prevented from being transmitted to the power connection common line L0 by the inductance means 11 to 14, and hence the conduction noise does not flow into other power lines. As a result, communications can be carried out by individually and independently using the plurality of power lines disposed for their respective uses, which are connected to the single battery, and the transmission speed and the communication accuracy can be improved.

Embodiment 2

Figure 3:
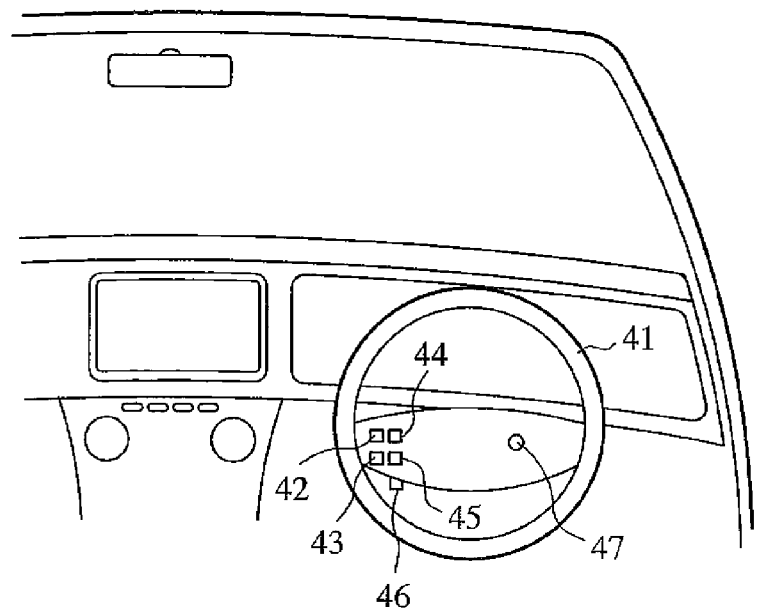
FIG. 3 is a figure showing a handle remote control for inputting various operation signals.

FIG. 3 is a figure showing a handle remote control for inputting various operation signals. In the figure, a volume up button 42, a volume down button 43, a channel up button 44, a channel down button 45, a voice start processing button 46, and a microphone 47 are disposed in the front of the handle 41.

Figure 4:
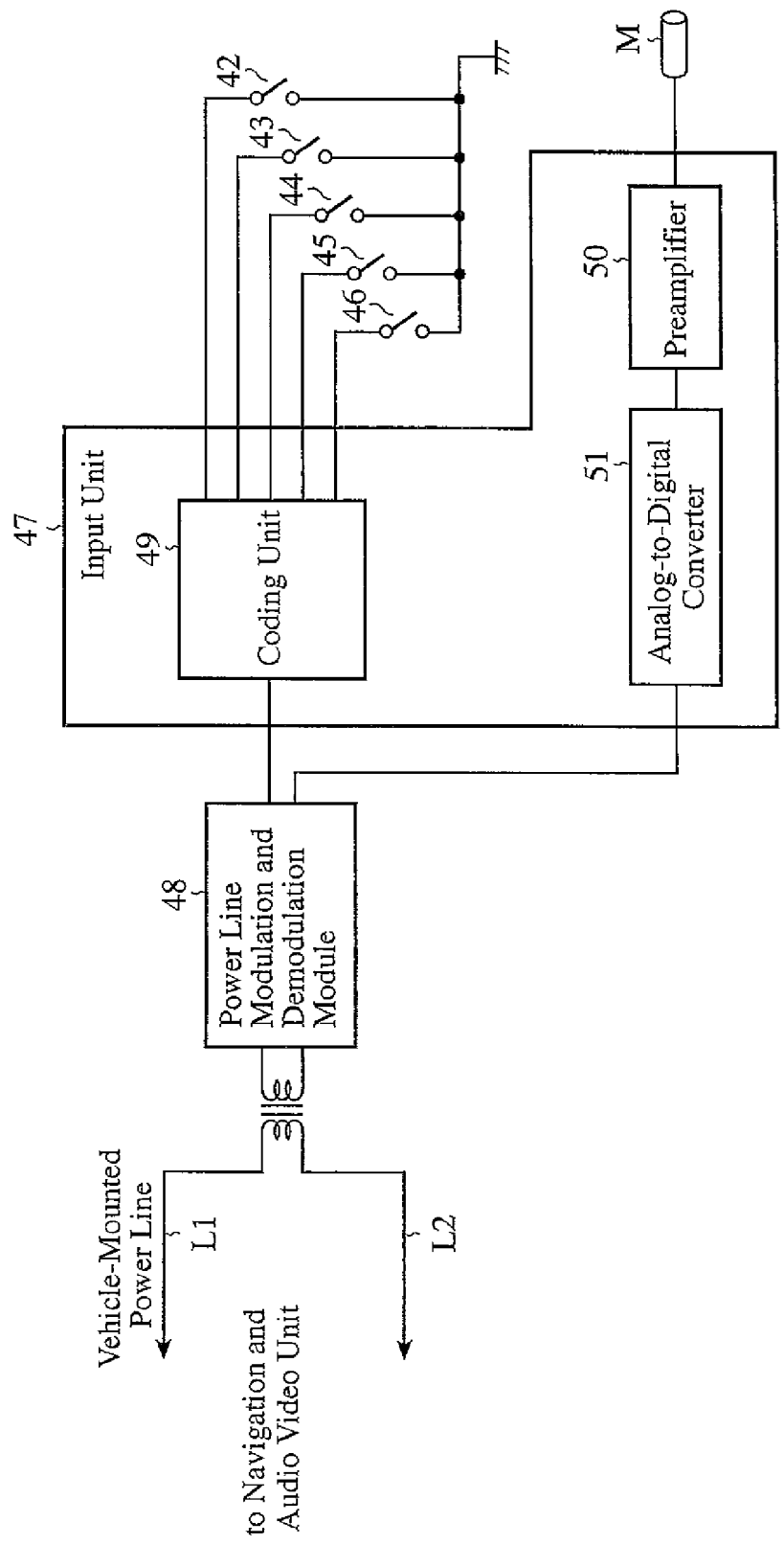
FIG. 4 is a block diagram showing a circuit for processing an operation signal from the handle remote control, and outputting the operation signal to power lines.

FIG. 4 is a block diagram showing a circuit for processing a signal from the handle remote control of FIG. 3, and outputting the processed signal to power lines L1 and L2, and the circuit is comprised of an input unit 47 for receiving a signal from the handle remote control, and a power line communication module 48 for outputting the output signal from this input unit 47 to the power lines. The input unit 47 is comprised of a coding unit 49 for coding the signal from the handle remote control, a preamplifier 50 for amplifying a signal from a microphone M, and an analog-to-digital converter 51.

Therefore, the signal from the handle remote control and the signal from the microphone M are sent to a navigation apparatus, an audio apparatus, or a video apparatus, which is not shown in the figure, from the input unit 47 by way of the power line communication module 48 and the power lines L1 and L2, so that each of the apparatuses can be made to perform a predetermined operation.

Embodiment 3

Figure 5:
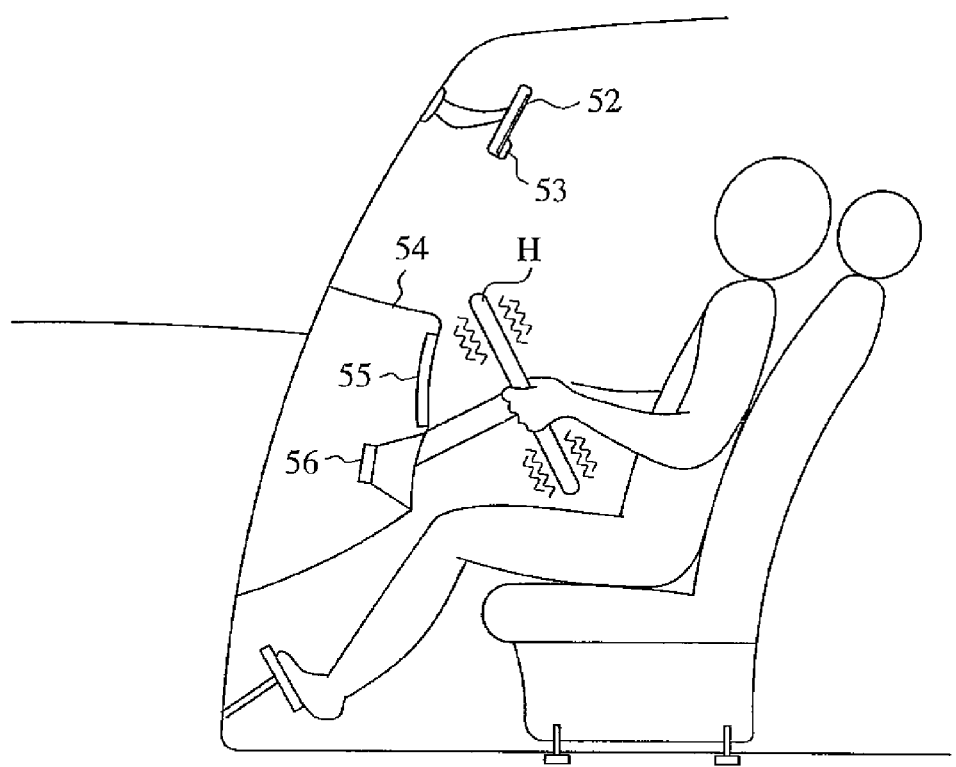
FIG. 5 is an outline figure showing an area of a vehicle which is close to a driver's seat.

FIG. 5 is an outline figure showing an area of a vehicle which is close to a driver's seat. In the figure, a camera 53 is mounted to a room mirror 52, and a monitor 55 and a speaker 56 are disposed in a front panel 54.

Figure 6:
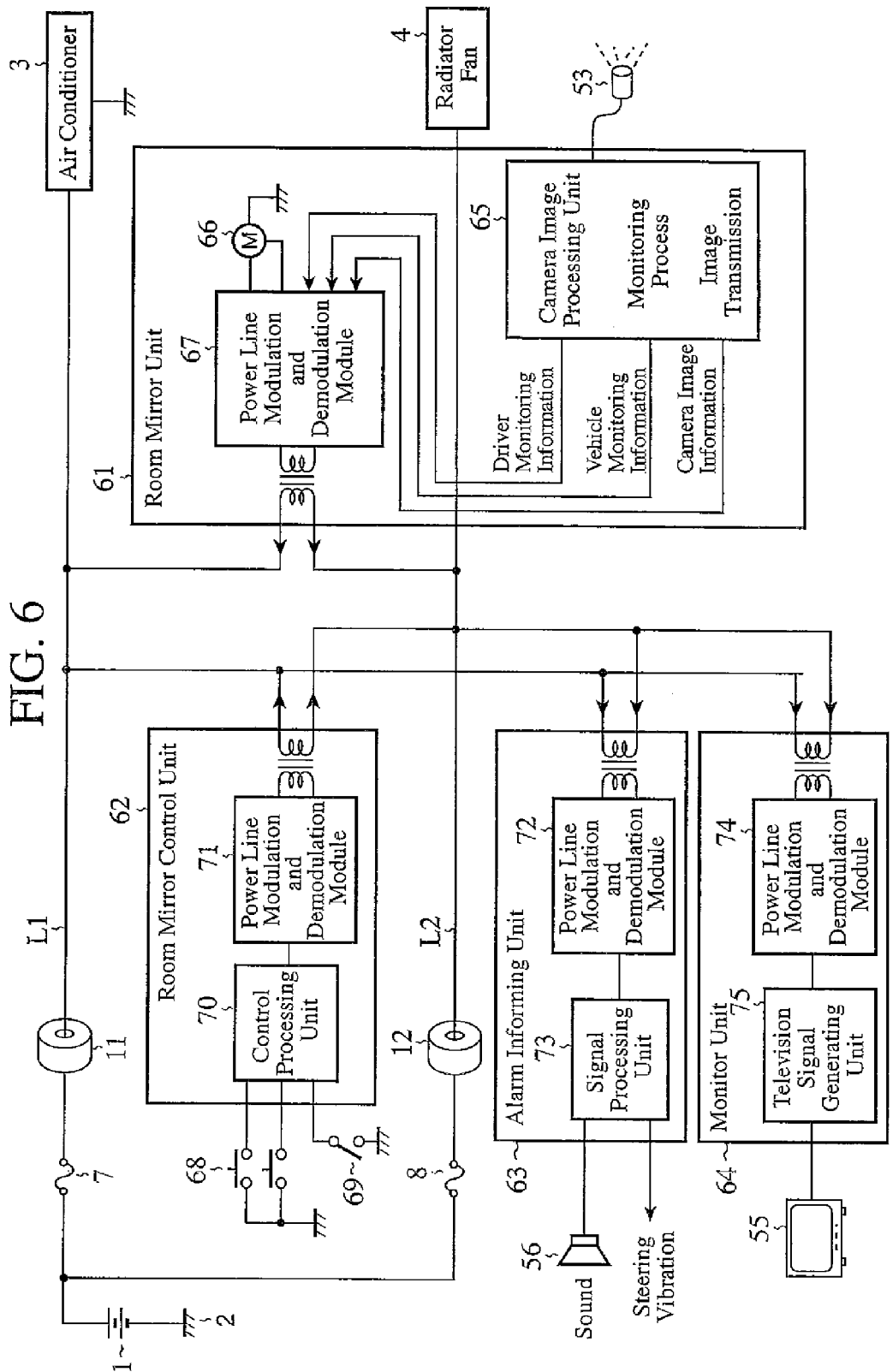
FIG. 6 is a circuit structure diagram of a circuit for transmitting imaging information from a camera to a monitor and a speaker, which are disposed near the driver's seat, by using power lines.

FIG. 6 shows a circuit structure diagram of a circuit which uses a power line communication apparatus in accordance with the present invention in order to transmit information among the camera 53, the monitor 55, and the speaker 56 shown in FIG. 5. A room mirror unit 61, a room mirror control unit 62, an alarm informing unit 63, and a monitor unit 64 are connected between a pair of power lines L1 and L2.

The room mirror unit 61 includes a camera image processing unit 65 for receiving and processing imaging information from the camera 53, and then outputs driver monitoring information, vehicle monitoring information, and camera image information, and a power line communication module 67 for outputting the driver monitoring information, the vehicle monitoring information, and the camera image information to the power lines L1 and L2, and for furnishing a signal transmitted thereto by way of the power lines L1 and L2 to a mirror angle setting motor 66.

The room mirror control unit 62 has a control processing unit 70 for processing both a passenger signal from a switch 68, which is closed when a passenger sits on a seat, and a signal from an antiglare switch 69, and a power line communication module 71 for outputting the output signals from the control processing unit 70 to the power lines L1 and L2.

The alarm informing unit 63 includes a power line communication module 72 for receiving a signal transmitted thereto by way of the power lines L1 and L2, and a signal processing unit 73 for processing the received signal to output a vehicle alarm or a driver state alarm by way of the speaker 56, and for vibrating the handle H through the steering to call attention to the driver, as shown in FIG. 5. The monitor unit 64 includes a power line communication module 74 for receiving a signal transmitted thereto by way of the power lines L1 and L2, and a television signal generating unit 75 for generating a television signal from the received signal to output the television signal to the monitor 55.

Hereafter, the operation of the circuit in accordance with this Embodiment 3 will be explained. The camera 53 performs image recognition of a scene in the back of the vehicle's cabin or performs image recognition of the state of the driver, and the camera image processing unit 65 then processes this image information. The driver monitoring information, the vehicle monitoring information, and the camera image information which are outputted from the camera image processing unit 65 are then transmitted from the power line communication module 67 to the power line communication modules 72 and 74 by way of the power lines L1 and L2. While those pieces of transmitted image information are processed by the signal processing unit 73 and are then informed by way of the speaker 56, the pieces of processed image information are used to vibrate the handle H through the steering to call attention to the driver. Furthermore, a television signal generated by the television signal generating unit 75 is delivered to the monitor 55 and the monitor 55 produces an image display.

In contrast, in a case in which the camera 53 is mounted in such a way to orient in a forward direction, the imaging information acquired by the camera 53, such as an image of a white line or a travel lane, is transmitted to the monitor unit by way of the power lines L1 and L2, as mentioned above, and is displayed on the monitor 55, so that the driver can know the state of a front side area in the vehicle traveling direction exactly.

As mentioned above, in accordance with embodiment 3, image information captured by the camera, which is processed by the camera image processing unit 65, is sent to the monitor 55 and the speaker 56 by using the power lines L1 and L2, and an output signal from the room mirror control unit 62 to which a passenger signal is inputted is sent to the room mirror unit 61 by using the power lines L1 and L2. Therefore, no signal lines for exclusive use are needed for transmitting those signals.

Embodiment 4

Figure 7:
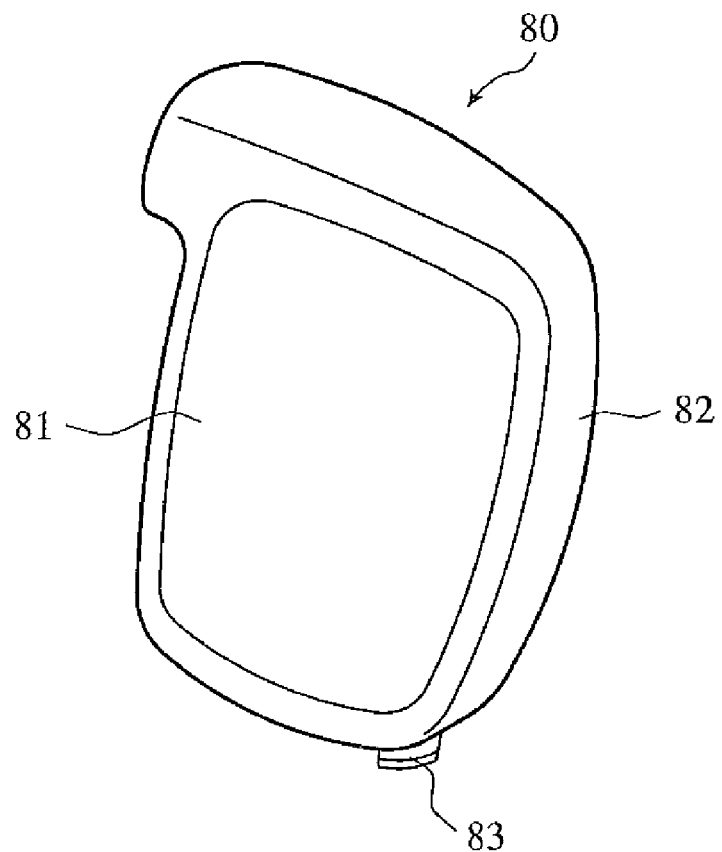
FIG. 7 is a perspective view showing a door mirror equipped with a camera.

FIG. 7 is a perspective view showing a door mirror in accordance with Embodiment 4 equipped with a camera. In the figure, the door mirror 80 has the camera 83 which is oriented downwardly and disposed on a lower surface of a door mirror casing 82 surrounding a mirror part 81. Imaging information produced by this camera 83 can be used for notification of an alarm about pull-over or out-of-lane of a vehicle.

Figure 8:
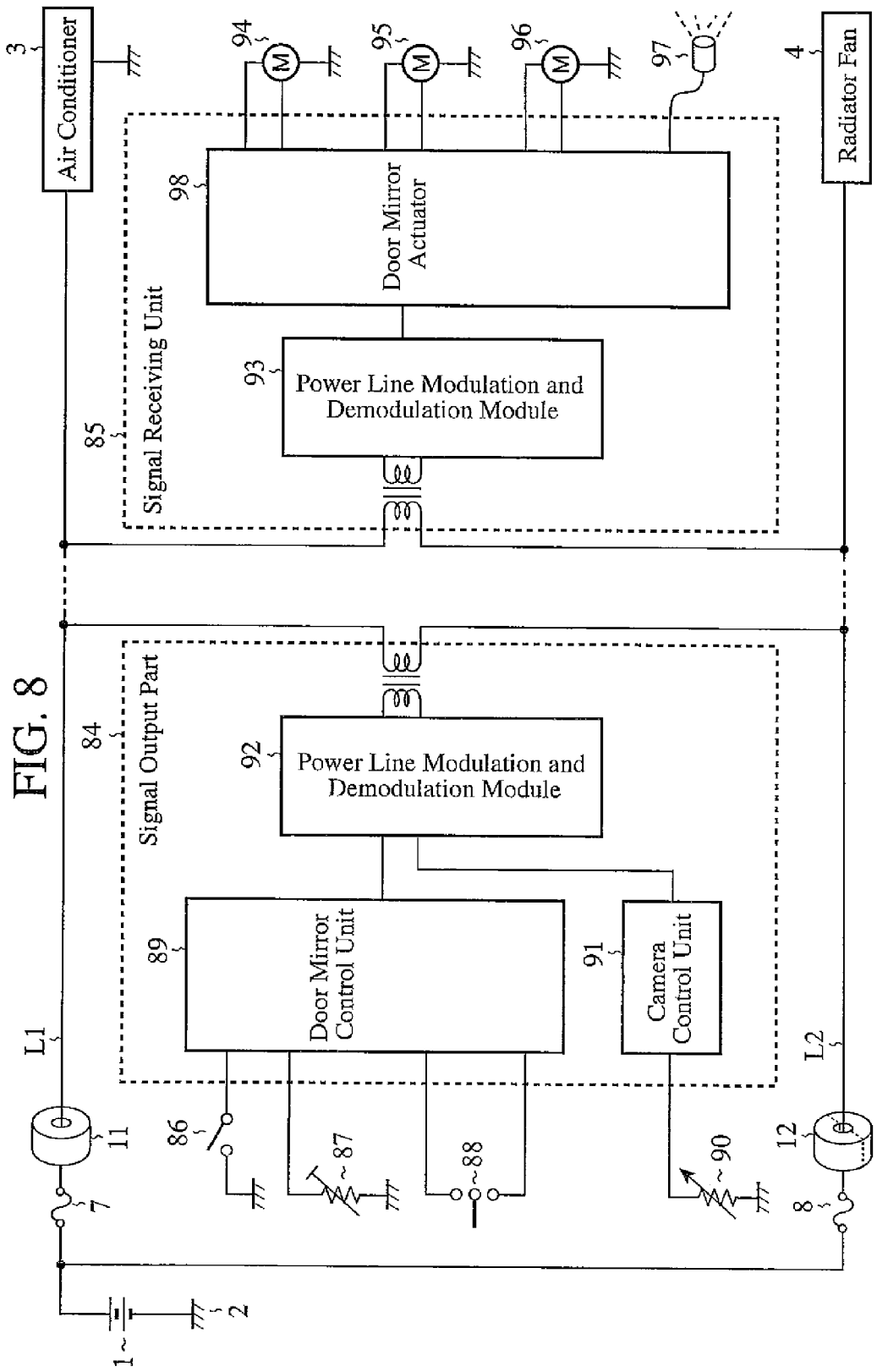
FIG. 8 is a circuit structure diagram of a circuit for transmitting imaging information from the camera which is integral with the door mirror by using power lines.

FIG. 8 shows a circuit structure figure of a circuit for transmitting the imaging information produced by the camera 83 which is integral with the door mirror 80 by using power lines. A signal outputting unit 84 and a signal receiving unit 85 are connected between a pair of power lines L1 and L2. The signal outputting unit 84 includes a mirror open/close switch 86, a mirror angle setting unit 87, a door mirror control unit 89 for receiving a signal from a right or left mirror selecting switch 88, a camera control unit 91 for receiving a signal from a camera angle setting unit 90, a door mirror control unit 89, and a power line communication module 92 for outputting a signal from the camera control unit 91 to the power lines L1 and L2.

On the other hand, the signal receiving unit 85 includes a door mirror actuator 98 for receiving the signal transmitted thereto via the power lines L1 and L2 by way of a power line communication module 93, and for controlling a motor 94 for mirror opening or closing, a mirror angle setting motor 95, a camera angle setting motor 96, and a camera 97.

Hereafter, the operation of the circuit in accordance with this Embodiment 4 will be explained. An operation signal from the door mirror control unit 89 which has received a signal from the mirror open/close switch 86, the mirror angle setting unit 87, or the right or left mirror selecting switch 88, and an operation signal from the camera control unit 91 which has received a signal from the camera angle setting unit 90 are transmitted by way of the power line communication module 92, and the power lines L1, and L2, and these operation signals are received by the door mirror actuator 98 by way of the power line communication module 93, so that the door mirror actuator 98 controls the motor 94 for mirror opening or closing, the mirror angle setting motor 95, the camera angle setting motor 96, and the camera 97 to make a setting of the mirror and a camera angle setting.

As mentioned above, in accordance with embodiment 4, the operation signals from the door mirror control unit 89 and the camera control unit 91 are transmitted to the door mirror actuator 98 by way of the power lines L1 and L2. Therefore, no signal lines for exclusive use are needed for transmitting those signals.

Embodiment 5

Figure 9:
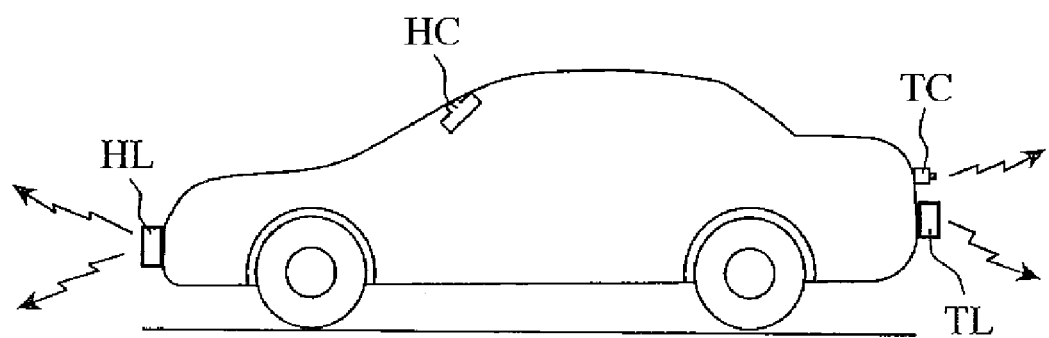
FIG. 9 is a side view of a vehicle equipped with a tail lamp, a tail camera, a head lamp, and a head camera.
Figure 10:
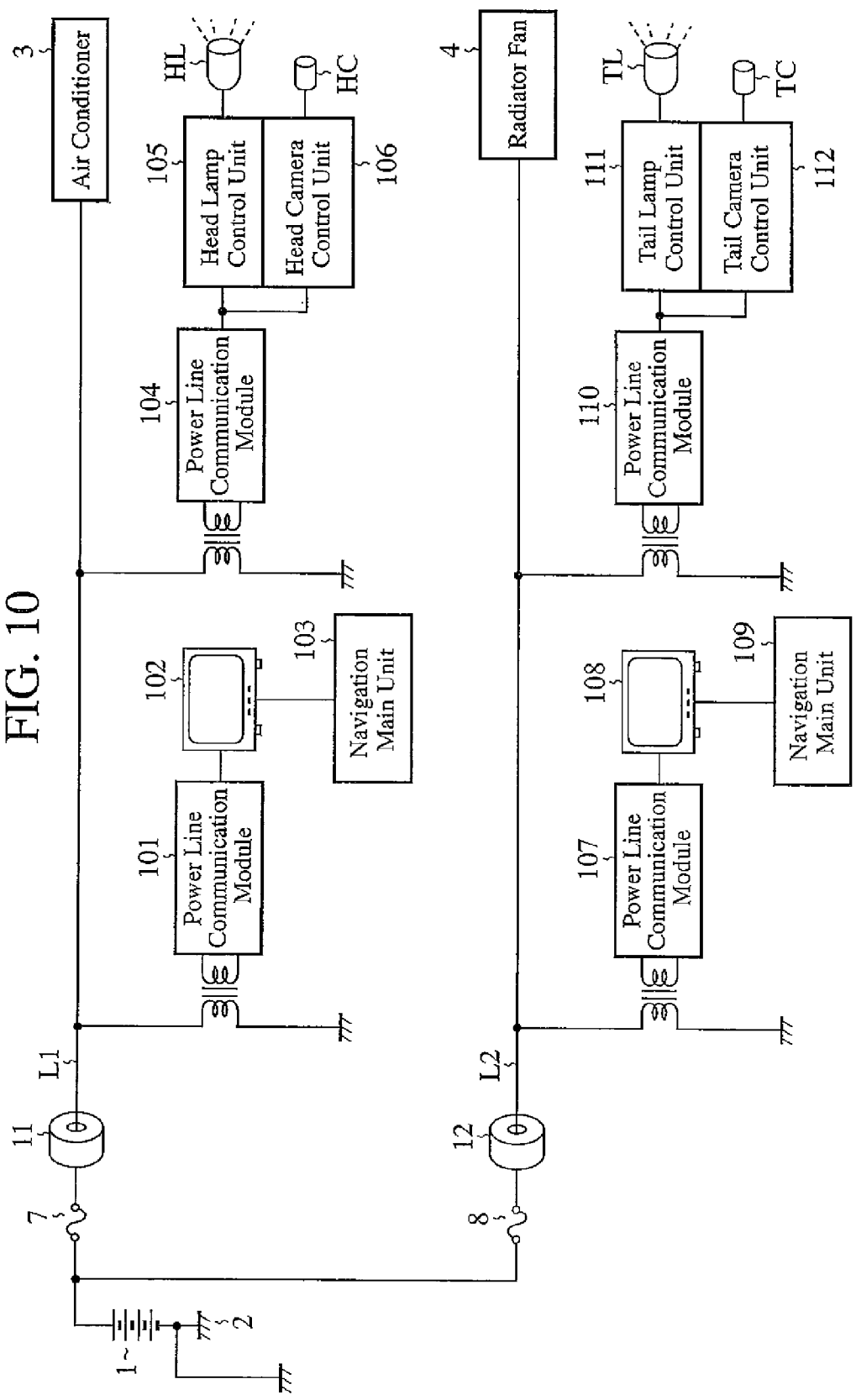
FIG. 10 is a circuit structure diagram of a circuit which uses power lines for transmission of signals among the tail lamp, the tail camera, the head lamp, and the head camera.

This Embodiment 5 is shown in FIG. 9 which is a side view of a vehicle equipped with a tail lamp TL, a tail camera TC, a head lamp HL, and a head camera HC. FIG. 10 shows a circuit structure figure of a circuit which uses a power line communication apparatus in accordance with the present invention for transmission of signals from and to a tail lamp TL, a tail camera TC, a head lamp HL, and a head camera HC which are shown in FIG. 9.

Fuses 7 and 8 and inductance means 11 and 12 are connected to end portions of power lines L1 and L2 on a side of a battery 1. A navigation main unit 103 provided with a monitor 102 is connected to the power line L1 by way of a power line communication module 101, and a head lamp control unit 105 for controlling the head lamp HL and a camera control unit 106 for controlling the head camera HC are connected to the power line L1 by way of a power line communication module 104.

Furthermore, a navigation main unit 109 provided with a monitor 108 is connected to the power line L2 by way of a power line communication module 107, and a head lamp control unit 111 for controlling the tail lamp TL and a camera control unit 112 for controlling the tail camera TC are connected to the power line L2 by way of a power line communication module 110.

Hereafter, the operation of the circuit in accordance with this Embodiment 5 will be explained. Control signals for the head lamp HL and the head camera HC, which are inputted by the navigation main part 103 when manipulated by a user, are transmitted to the head lamp control unit 105 and the camera control unit 106, respectively, by way of the power line communication module 101, the power line L1, and the power line communication module 104. The head lamp control unit 105 and the camera control unit 106 control the head lamp HL and the head camera HC according to the control signals transmitted thereto, respectively. Imaging information produced by the head camera HC is transmitted via the above-mentioned transmission route, and is displayed on the monitor 102.

On the other hand, control signals for the tail lamp TL and the tail camera TC, which are inputted by the navigation main part 109 when manipulated by a user, are transmitted to the tail lamp control unit 111 and the tail camera control unit 112, respectively, by way of the power line communication module 107, the power line L2, and the power line communication module 110. The tail lamp control unit 111 and the tail camera control unit 112 control the tail lamp TL and the tail camera TC according to the control signals transmitted thereto, respectively. Imaging information produced by the tail camera TC is transmitted via the above-mentioned transmission route, and is displayed on the monitor 108.

In the example illustrated, the navigation main units 103 and 109 are connected to the power lines L1 and L2 by way of the power line communication modules 101 and 107, respectively, though by connecting the power line communication module 110 to the power line L1, the power line L2, the power line communication module 107, and the navigation main unit 109 can be eliminated.

As mentioned above, in accordance with embodiment 5, pieces of imaging information produced by the head camera HC and the tail camera TC and control signals for the head lamp HL and the tail lamp TL are transmitted by way of the power lines L1 and L2, respectively. Therefore, no signal lines for exclusive use are needed for transmitting those signals.

Embodiment 6

Figure 11:
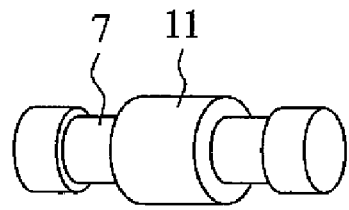
FIG. 11 is a configuration diagram of a fuse and an inductance means.
Figure 11:
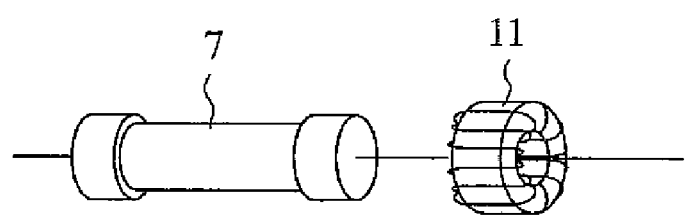
Figure 11:
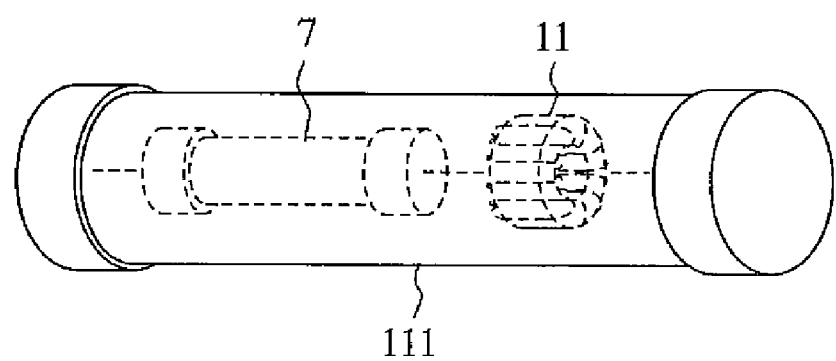

FIG. 11 shows examples of the structure of a fuse 7 and an inductance means 11 in accordance with the present Embodiment 1. FIG. 11(a) shows an example in which the inductance means 11 is disposed outside the fuse 7 and is formed cylindrically. FIG. 11(b) shows an example in which the inductance means 11 is connected in series to the fuse 7. FIG. 11(c) shows an example in which the inductance means 11 is connected in series to the fuse 7, and they are incorporated integrally in a fuse box 111.

As mentioned above, in accordance with embodiment 6, because the fuse 7 and the inductance means 11 are integral with each other, by simply connecting the fuse 7 to a power line, the power line can be made to be independent from any other power lines by using the inductance means 11. In other words, conduction noise which occurs in the power line can be prevented from flowing into any other power lines. Furthermore, the integrally forming of the fuse and the inductance means can downsize them and can provide space saving, and can also make it easy to be used.

INDUSTRIAL APPLICABILITY

As mentioned above, the power communication apparatus in accordance with the present invention can carry out proper communications without being influenced by conduction noise from other power lines because the power communication apparatus is provided with a fuse and an inductance means for each of power lines connected to a battery and disposed independently and individually, and can also carry out proper communications at a high speed by constructing a communication path from a plurality of power lines. Therefore, the power communication apparatus in accordance with the present invention is suitable for use as a power communication apparatus which uses a plurality of power lines disposed in a vehicle.

The invention claimed is:

1. A power line communication apparatus comprising:
   power lines disposed independently and individually, for connecting various loads to a battery by way of fuses, respectively;
   an inductor unit disposed at an end portion of each of said power lines on a side connected to said battery; and
   an information unit for transmitting information by way of each of said power lines,
   wherein the information unit is disposed between one pair of power lines, and a choke coil is disposed between said information unit and a ground.

2. The power line communication apparatus according to claim 1, wherein the information unit is disposed between the power lines and a ground.

3. The power line communication apparatus according to claim 1, wherein a gateway is connected between information unit which are connected to different power lines.

4. The power line communication apparatus according to claim 1, wherein the information unit includes a coding unit for receiving an operation button signal, and for coding said operation button signal, and transmits information from said coding unit to the loads by way of the power lines.

5. The power line communication apparatus according to claim 1, wherein the information unit comprises: a camera image processing unit for processing an image captured by a camera; an informing unit for informing the captured image transmitted thereto by way of the power lines from said camera image processing unit; and an attitude control unit for controlling an attitude of said camera.

6. The power line communication apparatus according to claim 5, wherein the camera is integral with one of a room mirror and a door mirror.

7. The power line communication apparatus according to claim 5, wherein said apparatus comprises:
   a first information unit including a head lamp control unit and a head camera control unit;

a second information unit including a tail lamp control unit and a tail camera control unit; and an information processing unit connected to said first information unit and said second information unit by way of power lines, for transmitting information.

8. The power line communication apparatus according to claim 1, wherein the fuses and the inductor unit are formed integrally.

* * * * *